No. 704,334. Patented July 8, 1902.
C. E. HUTCHINGS.
CAMERA.
(Application filed Apr. 4, 1902.)

(No Model.) 2 Sheets—Sheet 1.

Witnesses.
Robert Everett.

Inventor.
Charles E. Hutchings.
By James L. Norris.
Atty.

No. 704,334. Patented July 8, 1902.
C. E. HUTCHINGS.
CAMERA.
(Application filed Apr. 4, 1902.)
(No Model.) 2 Sheets—Sheet 2.
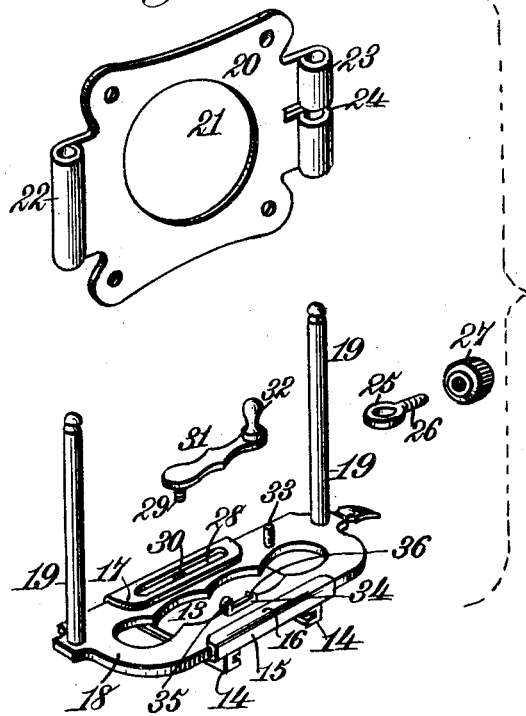
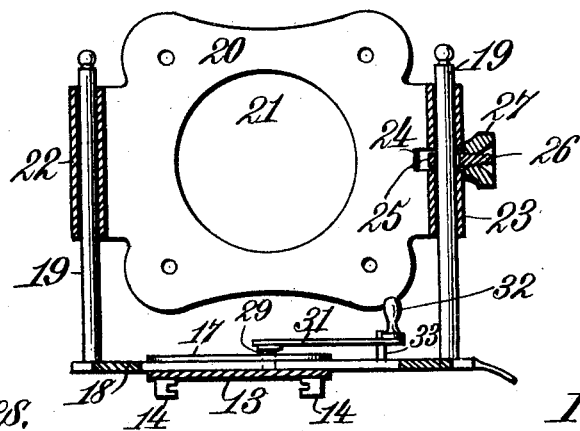
Witnesses. Inventor
Charles E. Hutchings.
By James L. Norris
Atty.

UNITED STATES PATENT OFFICE.

CHARLES E. HUTCHINGS, OF ROCHESTER, NEW YORK, ASSIGNOR TO ROCHESTER OPTICAL AND CAMERA COMPANY, OF ROCHESTER, NEW YORK, A CORPORATION OF NEW YORK.

CAMERA.

SPECIFICATION forming part of Letters Patent No. 704,334, dated July 8, 1902.

Application filed April 4, 1902. Serial No. 101,397. (No model.)

*To all whom it may concern:*

Be it known that I, CHARLES E. HUTCHINGS, a citizen of the United States, residing at Rochester, in the county of Monroe and State of New York, have invented new and useful Improvements in Cameras, of which the following is a specification.

This invention relates to cameras, and particularly to that class of cameras in which the lens is carried by a vertical rising front which may also be adjusted laterally; and it has for its object to provide novel, simple, and efficient mechanism for effecting such adjustment of the lens-front and for quickly and securely holding the parts in their adjusted positions.

It has also as its object to provide an improved means for attaching the lens and shutter and also the bellows to the lens-front in such manner that the shutter will be disposed extremely close to the front, so that it will occupy but very little space in the camera when the latter is closed.

To these ends my invention consists in the features and in the construction, combination, and arrangement of parts hereinafter described, and particularly pointed out in the claims following the description, reference being had to the accompanying drawings, forming a part of this specification, wherein—

Figure 1:
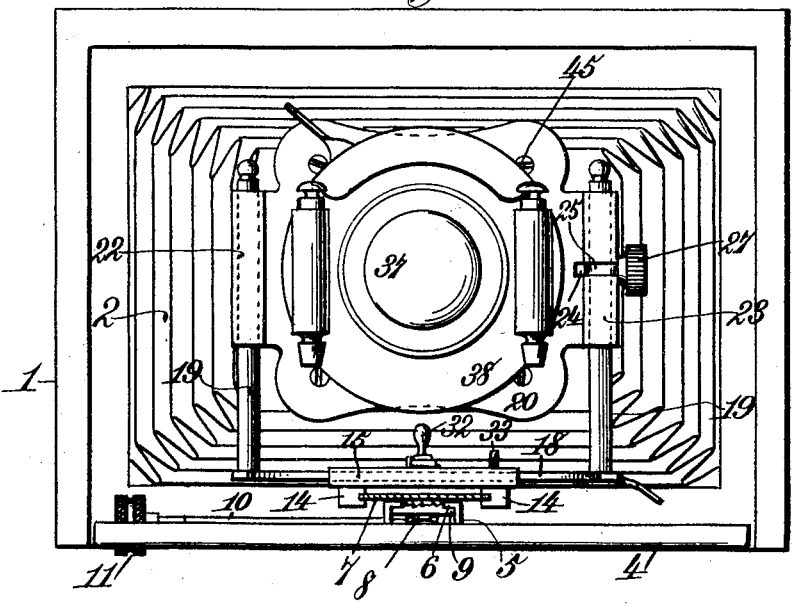
Figure 2:
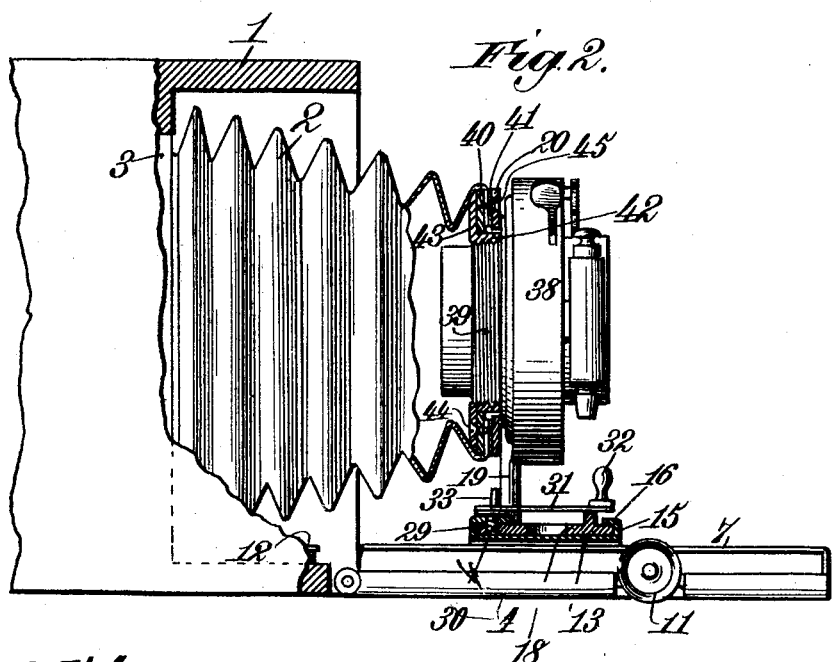

Figure 1 is a view in front elevation of a camera constructed according to my invention, the drop-front or bed being shown lowered. Fig. 2 is a view in sectional side elevation of the front portion of the camera, the drop-front also being shown lowered in this figure. Fig. 3 is a detail perspective view of the adjustable lens front and carriage, the parts being shown separated; and Fig. 4 is a view, partially in front elevation and partially in section, of the parts shown in Fig. 3, said parts being shown assembled together.

Referring to the drawings, the numeral 1 indicates the camera box or casing; 2, the bellows; 3, the bellows board or partition, to which the rear end of the bellows is attached, and 4 the hinged or drop front usually employed in cameras of this type and forming a bed for the lens-carriage when lowered to a horizontal position and operating to close the camera when folded up. Arranged longitudinally and centrally on the bed or drop-front 4 is a guideway for guiding the lens-carriage as the latter is adjusted in and out, said guideway comprising a plate 5, substantially U-shaped in cross-section and provided at its upper edges with inwardly-turned flanges 6. Arranged to move freely back and forth on the flanges 6 is a second and wider flat plate 7, provided on its under side with a longitudinal rack 8, which projects down between the flanges 6 and is provided on its opposite edges with lateral extensions 9, that fit under the said flanges and loosely hold the plate 7 to its seat thereon. A shaft 10 is rotatably fitted in the bed or drop-front 4 and is provided at one end with a milled knob 11, by which the shaft may be readily turned by hand, and at its other end is provided with a pinion (not shown) that engages the rack 8 and serves to move the rack and plate 7 on the flanges 6 to adjust the lens-carriage back and forth on the guideway. A guideway 12 is also fixed on the bottom of the front portion of the camera-casing and forms a continuation of the guideway on the bed, the purpose of the guideway 12 being to form a track, onto which the lens-carriage is run when the camera is closed up.

Adapted to be freely moved back and forth on the guide-plate 7 is the base of the lens-carriage, comprising a plate 13, arranged transversely on the plate 7 and provided on its under side with two parallel longitudinal ribs 14, which are grooved on their inner or adjacent sides, as most clearly indicated in Fig. 1 of the drawings. The grooved inner faces of the ribs 14 engage or embrace the opposite edges of the plate 7, whereby the bed 13 of the lens-carriage is free to be adjusted back and forth on the plate 7. The front and rear edges, respectively, of the bed-plate 13 are bent up vertically, as at 15, and are thence bent inward horizontally toward one another, as indicated at 16 and 17. Slidably arranged between the opposite edges 15 of the plate 13 and between said plate and the inturned flanges 16 and 17 is a horizontal plate 18, forming the bottom of the lens-carriage. Fixed in the opposite ends of the plate 18 are two vertical posts or pillars 19, and vertically movable on said posts or pillars is the lens-front, consisting of a thin metallic plate 20, provided centrally with a circular aperture 21, through which the rear end of the lens-tube is adapted to project, said plate 20 at its opposite side being bent or curled over upon itself to form two cylindrical sleeves 22 and 23, which encircle the posts or pillars 19 and are freely movable vertically thereon. For the sake of lightness the lens-front 20 is preferably made of aluminium. The sleeve 23 and the adjacent portion of the plate 20 are transversely and horizontally slotted, as at 24, and arranged in said slotted portion of the sleeve and encircling the corresponding posts or pillars 19 is a ring 25, provided with a lateral projecting screw-threaded shank 26, which extends through the slot 24 of the said sleeve and has screwed on its outer end a milled nut 27. By loosening the nut 27 the lens-front may be freely raised and lowered on the posts or pillars 19, and when said lens-front has been adjusted to the desired height it may be firmly secured in such adjusted position by tightening up the nut 27.

The inturned flange 17 of the bed-plate 13 is slotted longitudinally, as at 28, and passing through said slot is a screw 29, that is screwed into the threaded aperture 30, formed in the bottom 18 of the lens-carriage, and has fixed on its upper end the lever 31, provided at its free end with a knob or handle 32. It will be evident that when the lever 31 is turned in the direction of the hands of a watch the screw 29 will be screwed into the threaded aperture 30 and will cause the lower side of the lever 31 to bind upon the upper side of the flange 17 and clamp the plate 18 to said flange in such manner that the plate 18 can have no sliding movement between the flanges 16 and 17. A pin 33 is fixed in the plate 18, near one end thereof, to prevent the movement therepast of the lever 31 in one direction. A catch is also fixed centrally to the front portion of the plate 18 to limit the movement of the lever 31 in the opposite direction and to hold it locked. This catch consists of a lug 34, provided at one end with an upwardly-extending projection 35 and at its opposite end with a beveled projection 36, the construction being such that when the lever 31 is turned to lock the lens-carriage in its adjusted position on the base 13 the end of said lever will pass over the beveled lug 36 and will spring into place between the lugs 35 and 36 and will thereby be securely locked into position.

Referring to Figs. 1 and 2 of the drawings, the numeral 37 indicates the lens, which is fixed centrally in the front of the shutter-casing 38 in the ordinary and well-known manner. The lens-tube passes through the shutter-casing 38 and projects rearwardly thereof and is exteriorly threaded on its rear end, as at 39. The lens-tube loosely passes through the aperture 21 in the lens-front 20, the shutter-casing 38 resting against the front of the lens-front 20.

The numeral 40 indicates a central apertured rectangular plate of aluminium which is fitted in the foremost and endmost fold of the bellows 2, and said bellows is cemented to the front side of said plate, and preferably a piece of felt 41 is also cemented over the end fold of the bellows. A flanged and interiorly-threaded collar 42 is screwed over the threaded inner end 39 of the lens-tube, the flange 43 of said collar resting against the rear side of the aluminium plate 40 and secured thereto by screws 44. The plate 20, comprising the lens-front, is also secured to the aluminium plate 40 by screws 45. By means of this arrangement the shutter-attaching devices are all disposed within the bellows and in rear of the lens-front, and the shutter-casing is disposed close up against said front, so that the lens-carriage, the lens, the shutter, and the attaching devices will occupy an exceedingly small space when folded up within the camera and the camera closed.

In practice the locking means are provided for locking the plate 13 to the plate 7 to enable the carriage to be adjusted back and forth by means of the rack and pinion. Said locking means, however, form no part of the present invention, the same being fully shown, described, and claimed in a separate application filed by John A. Robertson and Charles E. Hutchings on the 13th day of March, 1902, Serial No. 98,107, coincident with the filing of this application.

By rotating the milled knob 11 the lens may be adjusted back and forth to properly focus the image upon the sensitive plate or film, and by disengaging the lever 31 and turning it to the right the plate 18, forming the bottom of the lens-carriage, may be shifted laterally to one side or the other and when in the desired position may be securely locked in place by restoring the lever 31 to its position between the projections 35 and 36. Furthermore, by loosening the nut 27 the lens-front, together with the lens, may be adjusted vertically to any desired height and may thus be locked in its adjusted position by tightening up the nut 27.

I have shown my invention applied to a camera of well-known type having a hinged or drop front; but it will be evident that it may be applied to many different types of cameras without departing from the spirit of the invention.

Having described my invention, what I claim is—

1. In a camera, the combination with two vertical posts, of the lens-front comprising a metallic plate provided centrally with an opening for the insertion of a lens, and having its opposite vertical edges bent up to form sleeves which encircle and are vertically movable on said posts, and means for locking one of said sleeves to the post which it encircles, substantially as described.

2. In a camera, the combination with two vertical posts, of a lens-front comprising a plate provided at its opposite sides with sleeves vertically movable on said posts, one of said sleeves being transversely slotted, a ring disposed in said slot and encircling the post therein, said ring being provided with a threaded shank projecting laterally through said slot, and a nut screwed on said shank and operating to bind the ring on the post, substantially as described.

3. In a camera, the combination with a plate supported on the bed of the camera and provided on its forward and rear edges with inturned overhanging flanges, one of said flanges being longitudinally slotted, of a plate slidably arranged between said flanges transversely to the camera-bed, an oscillatory lever-handle provided at one end with a screw projecting through said slot and tapped in said flanged plate, and a lens-front vertically movable on the sliding plate, substantially as described.

4. In a camera, the combination with a plate supported on the bed of the camera and provided on its forward and rear edges with inturned overhanging flanges, one of said flanges being longitudinally slotted, of a plate slidably arranged between said flanges transversely to the camera-bed, an oscillatory lever-handle provided at one end with a screw projecting through said slot and tapped in said flanged plate, a lens-front vertically movable on the sliding plate, and means for limiting the oscillatory movement of said lever, substantially as described.

5. In a camera, the combination with a plate supported on the bed of the camera and provided on its forward and rear edges with inturned overhanging flanges, one of said flanges being longitudinally slotted, of a plate slidably arranged between said flanges transversely to the camera-bed, and an oscillatory lever-handle provided at one end with a screw projecting through said slot and tapped in said flanged plate, a lens-front vertically movable on the sliding plate, and a beveled catch arranged to be engaged by said lever-handle and hold the same in its locked position, substantially as described.

6. In a camera, the combination with a bellows, the lens, and the shutter-casing, of the lens-front consisting of a thin centrally-apertured metallic plate, the externally-threaded lens-tube fitted in the rear side of the shutter-casing and projecting through said lens-front, a flanged collar screwed on said lens-tube in rear of the lens-front, and a metallic plate attached to the forward end of the bellows and clamped between the lens-front and the flange on said collar, substantially as described.

In testimony whereof I have hereunto set my hand in presence of two subscribing witnesses.

CHAS. E. HUTCHINGS.

Witnesses:
JOHN A. ROBERTSON,
GEO. W. REILLY.